MAGNETIC STORAGE MEDIUM FOR ENHANCING MAGNETO-OPTIC READOUT

Filed Nov. 4, 1966 2 Sheets-Sheet 1

INVENTOR.
ROBERT P. HUNT

BY Robert S. Clay

ATTORNEY

Oct. 14, 1969 R. P. HUNT 3,472,575

MAGNETIC STORAGE MEDIUM FOR ENHANCING MAGNETO-OPTIC READOUT

Filed Nov. 4, 1966 2 Sheets-Sheet 2

INVENTOR
ROBERT P. HUNT

BY Robert S. Clay

ATTORNEY

United States Patent Office 3,472,575

Patented Oct. 14, 1969

3,472,575
MAGNETIC STORAGE MEDIUM FOR ENHANCING MAGNETO-OPTIC READOUT

Robert P. Hunt, Menlo Park, Calif., assignor to Ampex Corporation, Redwood City, Calif., a corporation of California Filed Nov. 4, 1966, Ser. No. 592,040
Int. Cl. G02f 1/22
U.S. Cl. 350—151 3 Claims

ABSTRACT OF THE DISCLOSURE

An improved magnetic storage medium utilizing a coating of improved dielectric material having a relatively high refractive index and a preselected thickness.

The invention herein described was made in the course of a contract with the Department of Army.

The present invention relates to an improvement in magneto-optic readout systems and more particularly to an improved magnetic storage medium for enhancement of Kerr magneto-optic readout effects in a magneto-optic readout system.

Prior are magneto-opetic readout systems utilizing magnetic storage mediums employ thin dielectric coatings of materials such as zinc sulfide, cadmium sulfide, or silicon oxide, deposited on a magnetic storage medium to enhance the Kerr effect exhibited thereby upon readout in the magneto-optic system. The use of the dielectric coating material on the storage medium provides a small enhancement of the Kerr magneto-optic effects, but fails to provide the degree of enhancement which is desirable in a practical magneto-optic readout system.

The present invention therefore, overcomes the above-noted shortcomings of prior art mediums commonly employed with magneto-optic readout systems, by providing an improved magnetic storage medium wherein the Kerr rotation of a magneto-optic readout system is enhanced on the order of 8 times that provided by prior art mediums, and the transverse Kerr effect is enhanced on the order of 15 times.

Therefore it is an object of the present invention to provide an improved magnetic storage medium for use in magneto-optic readout systems which exhibits an unexpectedly large enhancement of the Kerr magneto-optic effects.

It is another object of the invention to provide an improved dielectric material for coating a magnetic medium for use in magneto-optic readout systems.

It is another object of the present invention to provide an improved magnetic storage medium for magneto-optic readout systems which provides greater Kerr rotation and contrast in the longitudinal and polar Kerr effects and a higher relative change in reflectivity in the transverse Kerr effect.

Additional objects and advantages will be apparent from the specification taken in conjunction with the drawings in which.

Figure 1:
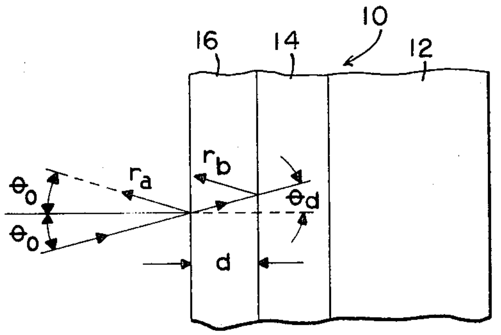
FIGURE 1 shows a schematic cross-section of a magnetic storage medium in accordance with the invention depicting the incident beam and the resulting reflected beams generated in the medium.

Briefly referring to FIGURE 1 there is depicted a storage medium 10 of the present invention which provides new and unexpected results in magneto-optic readout effects. The medium 10 is formed of a substrate 12 upon which is deposited a magnetic material layer 14. In accordance with the invention a dielectric coating 16, preferably of silicon metal, is deposited on the magnetic layer 14. In addition, the invention further contemplates the use of selected dielectric layer thicknesses and angles of incidence of the optical beam.

Silicon metal has been found to be the preferred dielectric material for coating the magnetic medium due to its property of a high refractive index (approximately 4.0) in the optical range, which value nearly matches the anti-reflection condition $r_{23}e^{i\phi}+r_{12}e^{-i\phi}=0$, where $r_{12}$ and $r_{23}$ are the Fresnel reflection coefficients associated with the refractive indices and angles of incidence of the air-dielectric and dielectric-metal interfaces respectively. The phase, $\phi$ is equal to $$2\pi\frac{d}{\lambda}N_2\cos\theta_2$$

where $d$ is the dielectric thickness, $\lambda$ is the wavelength of light, $N_2$ is the dielectric refractive index and $\theta_2$ is the refractive angle of the light in the dielectric. Silicon metal has the additional advantages of being easily prepared and readily evaporated, thereby facilitating handling and use as the dielectric coating.

It is well known that there are three basic magneto-optic effects termed polar, longitudinal, and transverse. These effects differ only in the orientation of the magnetization relative to the plane of incidence, and to the surface of the film. As is generally known, the interaction of the reflected light with the magnetic medium is known as the Kerr magneto-optic effect, and the interaction of the transmitted light with the magnetic medium is known as the Faraday effect.

It is also known that the polar and longitudinal magneto-optical effects produce a rotation in the plane of polarization upon reflection or transmission, while in the transverse effect there is no inherent rotation mechanism, but rather, the reflection and transmission coefficients are perturbed by the magnetization.

By way of illustration only, consider the polar and/or longitudinal Kerr effect. The reflected radiation $E_p^r$ (component of reflected electric field parallel to the plane of incidence) and $E_s^r$ (component of reflected electric field perpendicular to the plane of incidence) are related to the incident fields $E_p^i$, $E_s^i$ by equations of the form $$E_p^r=R_{pp}E_p^i+R_{ps}E_s^i$$
$$E_s^r=R_{sp}E_p^i+R_{ss}E_s^i$$

where $R_{pp}$ and $R_{ss}$ are well known Fresnel reflection coefficients related to the refractive indices and angles of incidence, and $R_{ps}$ and $R_{sp}$ are the magneto-optic Kerr reflection coefficients and are generally small.

For example, consider only $p$ light incident to the medium (i.e. set $E_s^i=0$). Then $$E_p^r=R_{pp}E_p^i$$
$$E_s^r=R_{sp}E_p^i$$

and the Kerr rotation $k_p$ defined as the angle through which the plane of polarization is rotated is:

$$\text{Tan } k_p\simeq k_p=\frac{E_s^r}{E_p^r}=\frac{R_{sp}}{R_{pp}}$$

In a typical magneto-optic readout system the reflected (or transmitted) light is passed through an analyzing element such as a Glans-Thompson prism, and then onto the detector. It is generally known that the detected signals which is proportional to the difference in the reflected intensities I for oppositely magnetized bits is (for unit input intensity)

$$S=I(+M)-I(-M)=2\ |R_{pp}|\ |R_{sp}|\ \sin 2\theta_a \cos(\delta_{sp}-\delta_{pp})$$

where $\theta_a$ is the angle of the analzer relative to the $s$ direction, M is the magnetization, and $\delta_{sp}$ and $\delta_{pp}$ are the phases of the complex quantities $R_{sp}$ and $R_{pp}$ respectively. Since detectors are shot noise limited, the detector noise is proportional to the square root of the light intensity at the detector. Thus the signal to noise ratio, $S/N$ is $$\frac{S}{N}=\frac{S}{\sqrt{R_{pp}^2}}=2R_{sp}\sin 2\theta_a \cos(\delta_{sp}-\delta_{pp})$$

Finally the contrast, C, may be defined as $$C=\frac{I(+M)-I(-M)}{\left(\frac{I(+M)+I(-M)}{2}\right)}$$

when $\theta_a$ is significantly greater than $k_p$ we have for $$\frac{I(+M)+I(-M)}{2}\ \frac{1}{2}[I(+M)+I(-M)]=|R_{pp}|^2 \sin^2\theta_a$$

and the contrast, $C=4\ |k_p|\cos\delta k \cot\theta_a$.

From these equations it becomes obvious that it is desirable to realize as large an $R_{sp}$ as possible in order to provide increased enhancement of the magneto-optic effects. Also, for maximum contrast it is desirable to enhance the Kerr rotation $k_p$. Enhancement of $k_p$ and of $R_{sp}$ may be achieved by coating the magneto-optic medium with one or more dielectric coatings. It is readily shown that for a thick magnetic film coated with an arbitrary number of dielectrics, $R_{sp}$ for the structure is given for the longitudinal magneto-optic effect.

and for the polar magneto-optic effect $$R_{sp}{}^{l}=\frac{1}{4}\ iQT_{pp}T_{ss}\frac{\tan\theta_0}{\cos\theta_m}$$

and for the polar-magneto-optic effect $$R_{sp}{}^{p}=\frac{1}{4}\ iQT_{pp}T_{ss}\frac{\tan\theta_0}{\sin\theta_m}$$

where $p$ and $l$ refer to the polar and longitudinal effects respectively, Q is a proportionality constant measuring the strength of the magneto-optic effect, $T_{pp}$ and $T_{ss}$ are the transmission coefficients measuring the amount of light transmitted into the magnetic film for $p$ and $s$ light respectively, $\theta_0$ is the incident angle to the structure, and $\theta_m$ is the refracted angle in the magnetic medium.

Thus the derived equations show that a high value for $T_{pp}$ and $T_{ss}$ is desired, or conversely a low value of $R_{pp}$ and $R_{ss}$ is desired. To this end, it is desirable to antireflection coat the magnetic medium so that $$R_{pp}\simeq R_{ss}\simeq 0$$

Regarding now the transverse magneto-optic effect, same is characterized only by a small change in the usual Fresnel coefficients. It is generally known that for metals such as iron, nickel, or cobalt, or alloys of these, that it is only $R_{pp}$ and $T_{pp}$ which become modified by the magnetization in the visible spectrum. Thus for example, in a reflection experiment $$R_{pp}=R_{pp}{}^0+\Delta R(M)$$

where M is the magnetization, $R_{pp}{}^0$ is the ordinary reflection coefficient and $\Delta R$ is the magneto-optic contribution. Optimum conditions result if we set $$R_{pp}{}^0=-\Delta R(M)$$

Then the signal S at the detector for unit input intensity is, $$S=I(+M)-I(-M)=4\ |\Delta R|^2$$

For a shot noise limited system the signal to noise is $$\frac{S}{N}=\frac{4|\Delta R|^2}{2|\Delta R|}=2\ |\Delta R|$$

and the contrast is $$C=\frac{4|\Delta R|^2}{|R_r|^2}=4\left|\frac{\Delta R}{R_r}\right|^2$$

where $R_r$ is the residual reflectivity due to inability to perfectly match the films.

Accordingly, by making $R_{pp}{}^0$ small, the contrast in the transverse effect may be made large. Likewise it may be shown that the change in reflectivity is $$\Delta R=\frac{1}{2}\ iQT_{pp}^{0}{}^2\tan\theta_0$$

where Q is the same proportionality constant appearing in $R_{sp}{}^p$ and $R_{sp}{}^l$, and $\theta_0$ is the incident angle to the structure. It follows that for optimum enhancement in $\Delta R$, and hence in signal-to-noise ratio, it is desirable for $T_{pp}{}^0$ to be large and hence $R_{pp}{}^0$ to be small.

Thus for enhance of the signal S, signal-to-noise ratio $S/N$ and contrast C of each of the magneto-optic effects, it is desirable to realize as large a transmission of light into the film as possible and conversely, as low a reflectivity as possible.

From generally known theory it may be shown that the reflection coefficient for a structure consisting of a thin dilectric film of thickness $d$ and refractive index $N_2$ on a thick magnetic film is $$R=\frac{r_{23}e^{i\phi}+r_{12}e^{-i\phi}}{r_{12}r_{23}e^{i\phi}+e^{-i\phi}}$$

where $$\phi=\frac{2\pi d}{\lambda_0}N_2\cos\theta_2$$

and $r_{23}$ is the Fresnel reflection coefficient at the dielectric-magnetic metal interface, while $r_{12}$ is the reflection coefficient at the air-dielectric interface, $\lambda_0$ is the radiation wavelength, and $\theta_2$ is the refracted angle in the dielectric. The subscript 2 designates the dielectric material. The condition that $R=0$ stipulates that, $$r_{23}e^{i\phi}+r_{12}e^{-i\phi}=0$$

which places a restriction on the value of refractive index $N_2$ and the thickness $d$ of the dielectric.

Figure 2:
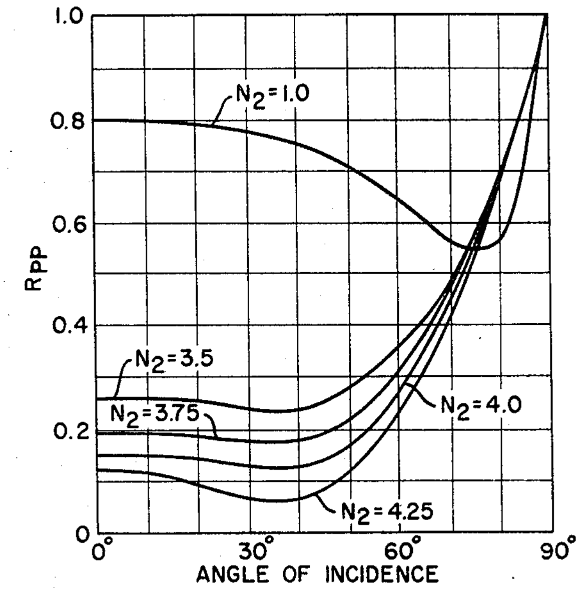
FIGURE 2 is a graph showing a typical calculation of R as a function of angle of incidence for a Permalloy magnetic film with a dielectric coating of various dielectric constants $N_2$.

Accordingly, referring to FIGURE 2 there is shown a typical calculation of R as a function of angle of incidence for a thick Permalloy magnetic film ($n=2.4+i.\ 3.9$) with a dielectric on top, for several different dielectric constants $N_2$, and for a fixed dielectric thickness $$d=\lambda_0/8N_2$$

It is seen that a refractive index of around 4.25 provides a very good antireflection coating for use with the Permalloy in accordance with the invention, causing the reflectivity to fall from about 0.7 to 0.06 at about a 40° angle of incidence.

To study the effect of dielectric overlayers on transverse magneto-optic effects, a series of optically thick (1000 A.) moly-Permalloy films were prepared by vacuum evaporation from bulk 4% moly-Permalloy. For a dielectric of high refractive index, silicon metal was chosen with a refractive index of about 4 at a wavelength of 5460 A. The extinction coefficient of silicon at this wavelength is about 0.4 and may be regarded as small. A layer of silicon metal was vacuum deposited at various thicknesses ranging from 25 A. to 650 A. onto a series of identical magnetic films. On each slide half of the magnetic film was left unexposed to the silicon so that the unenhanced properties could be measured. The reflectivity of the samples was measured at the green line of mercury as a function of the angle of incidence.

Figure 3:
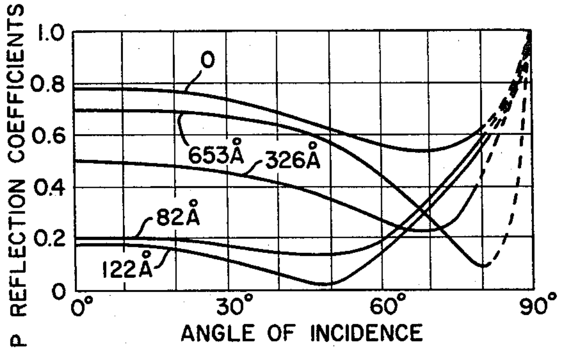
FIGURE 3 is a graph showing a comparison between the P reflection coefficients and the angle of incidence of the beam, relative to varying thicknesses of the dielectric coating.

Thus referring to FIGURE 3 it is seen that the $p$ reflection coefficient varies widely with thickness of the silicon layer. In the case for which the silicon layer was 122 A. thick ($3\lambda_0/32N_2$) the reflectivity drops to about 0.04 at a 50° angle of incidence. The longitudinal Kerr effect for this sample was measured. The real part of the double Kerr rotation $2R_{sp}/R_{pp}$ for $p$ polarized light was found to be 60′ while the imaginary part (sometimes called the Kerr ellipticity) was found to be −115′. Thus with an optimum phase plate instead of a quarter wave plate, a net double Kerr rotation in excess of 2° is available around the 50° angle of incidence point as shown in FIGURE 3. The unenhanced films show a maximum rotation of about 6′. Thus it may be seen that $k_p$ has been enhanced by about 20 times over the unenhanced magnetic film's value by using the silicon material.

Figure 4:
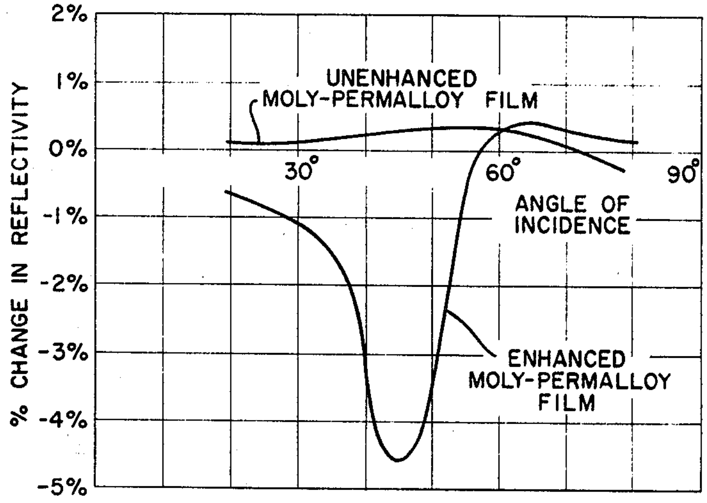
FIGURES 4 and 5 are graphs comparing the percentage change in reflectivity and the Kerr rotation respectively, versus the angle of incidence of the light beam for the improved storage medium of the invention.

In FIGURE 4 there is shown the variation of the transverse Kerr effect as measured by the contrast defined previously and depicted as a percentage change of reflectivity versus the angle of incidence of the beam. The results for an enhanced as well as unenhanced film are shown; the contract is cnhanced by about 15 times over the unenhanced value. The value of the refractive index of the unenhanced film was found to be about 2.5 +i. 4.0.

Thus it may be seen that the transverse Kerr effect can be enhanced in contract in a similar manner to the longitudinal Kerr effect. Further, it is seen that the use of silicon metal is superior to the usual dielectrics used such as ZnS, CdS and SiO, for enhancing the contrast in Permalloy films.

Figure 5:
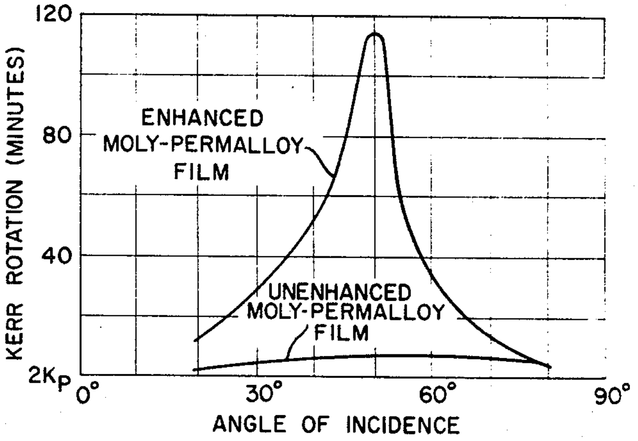

FIGURE 5 shows the Kerr rotation achieved versus the angle of incidence of the beam for an unenhanced film and for an enhanced film of the invention. As may be seen the Kerr rotation or contrast for an enhanced film is of the order of 2°, which is of the order of 20 times the enhancement provided by unenhanced films.

Although the invention has been described herein with respect to a single embodiment, various modifications may be made thereto within the spirit of the invention. For example although the invention was described in the example utilizing permalloy as the magnetic material layer 14 it is to be understood that other materials such as nickel, cobalt, iron and related alloys thereof could be used in the place of permalloy.

What is claimed is:

1. An apparatus for enhancing Kerr magneto-optic readout effects in a magneto-optic readout system including a magnetic recording medium, which system utilizes a polarized beam of light to scan the medium, said medium including a magnetic storage layer deposited upon a substrate layer, the combination comprising; a layer of material of a relatively high index of refraction of the order of from 3.0 to 4.25 deposited upon said magnetic storage layer, said layer being of selected thickness of the order of from 25 A. to 650 A. as substantially determined by the wavelength of light, and said beam of light being directed against said medium at a selected angle of incidence.

2. The combination of claim 1 wherein said layer of material is silicon metal.

3. The combination of claim 1 wherein the angle of incidence of said beam is of the order of 45 to 50 degrees.

References Cited

UNITED STATES PATENTS

| | | | |
|---|---|---|---|
| 3,224,333 | 12/1965 | Kolk et al. | 350—151 |
| 3,393,957 | 7/1968 | Smith | 350—151 |
| 3,394,360 | 7/1968 | Miyata. | |

DAVID SCHONBERG, Primary Examiner

P. R. MILLER, Assistant Examiner

U.S. Cl. X.R.

340—174.1; 350—166